Dec. 17, 1968
C. A. ROWLEY
3,416,584
VEGETABLE GRATER AND SLICER
Filed Jan. 23, 1967
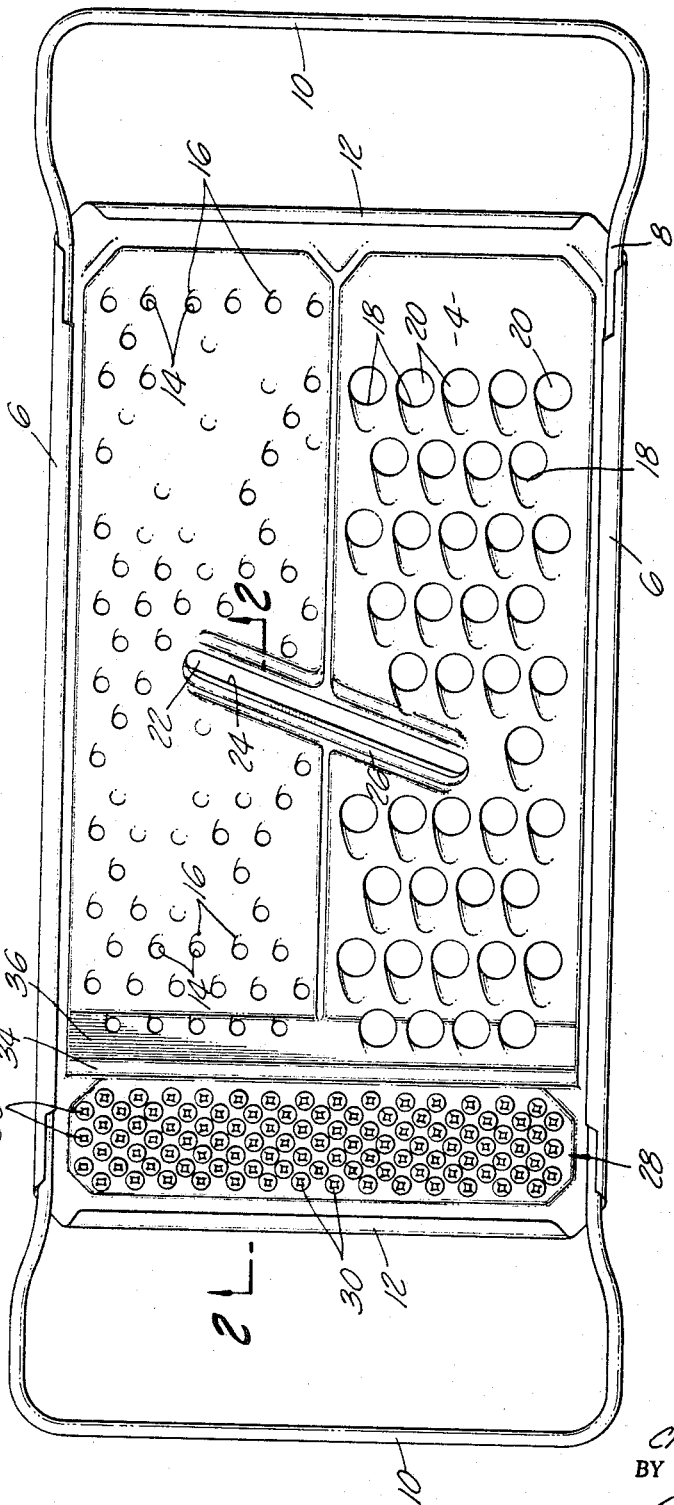
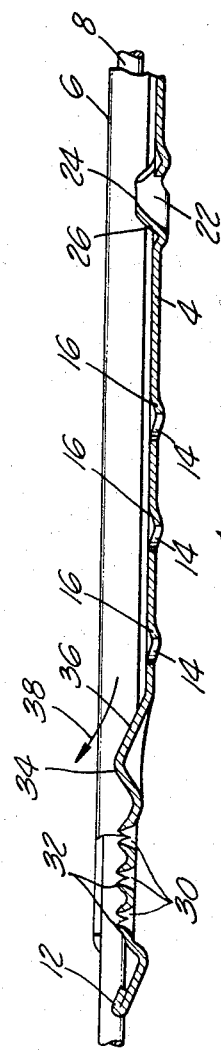
INVENTOR.
CHARLES A. ROWLEY
BY
Albert Huckabee
ATTORNEY United States Patent Office 3,416,584
Patented Dec. 17, 1968

3,416,584
VEGETABLE GRATER AND SLICER
Charles A. Rowley, 7803 E. Harper,
Downey, Calif. 90241
Filed Jan. 23, 1967, Ser. No. 610,937
3 Claims. (Cl. 146—171)

ABSTRACT OF THE DISCLOSURE

A combination vegetable grater and slicer. A transverse rib is disposed between the slicer means and the grater means in order to divert a product being sliced and the user's fingers away from the grater means.

This invention relates to a vegetable grater and slicer.

Various types of graters and slicers have been marketed for a number of years. They are of a type which includes a flat sheet of metal having apertures stamped therein with edge portions thereof shaped to perform various types of grating, slicing or other cutting operations on vegetables such as potatoes, carrots, cabbage, etc. These implements have included different portions with different types of grating, cutting or shredding formations. Some of them have included a diagonally transverse slot, one side of which is defined by a cutting edge portion at an angle to the plane of the metal sheet. In some of these the sheet is provided with a series of formations for a cutting or grating operation, and it has been the experience of users thereof that when the transverse slicer feature is used, not only the article being sliced but also the fingers of the user will engage the grater or other cutting portions behind the slicer and the skin of the fingers will become cut or torn.

It is an object of the present invention to provide a device of the type described wherein means is incorporated between the transverse slicing cutter and a grater portion which will divert the article being sliced, and more importantly, the fingers of the user will not be injured from such grater or similar cutting portion behind the slicer.

Another object of the invention is to provide a device of the type described wherein the finger diverter, like the various cutter and grater elements, is formed integrally with the sheet of material comprising the body of the implement.

The above and other objects will more fully appear from the following description in connection with the accompanying drawing.

FIG. 1 is a plan view of an embodiment of the invention;

FIG. 2 is an enlarged sectional detail taken approximately on the line 2—2 of FIG. 1.

The device includes a body comprising a sheet 4 of thin material, preferably metal, which has its side edges 6 rolled upon the sides of a generally rectangular wire frame 8 whose ends extend beyond the ends of the sheet 4 to provide handles 10. The ends 12 of the sheet 4 are rolled to eliminate the otherwise sharp end edges.

The sheet 4 is provided with small apertures 14 having adjacent slightly indented portions 16, the edges of which comprise cutters over which vegetables or other food articles can be drawn to shred them. Similar cutting edges 18 defining portions of larger openings 20, are provided in another portion of the sheet 4 to produce shredders of larger size than the smaller ones first mentioned. These shredder sections can conveniently be elongated in each longitudinal half of the sheet 4.

Extending diagonally across a medial portion of the sheet 4 is an elongated slot 22, one side of which is defined by a cutting edge 24 on an upwardly angled portion 26 of sheet 4. This comprises the slicer element. As shown in FIG. 2 the small shredder apertures 14 are defined partially by indented portions struck from the opposite side of the sheet relative to the angled portion 26 carrying the slicer edge 24. Thus, when an article to be sliced is held against and moved along the left side of the sheet, as viewed in FIG. 2, the portions 16 of the shredder elements, being struck in the opposite direction, will not interfere with sliding of the article into the slicer.

At the lower end of the sheet 4, as viewed in FIG. 1, is a transversely elongated area 28 having grater portions 30 struck therein. Each grater element is defined by prongs or teeth 32 which are sharp and which will injure the fingers if they contact them. The grater elements 30 are struck outwardly from the sheet in a direction opposite to the projections 16 of the small and large shredder elements, so that when the shredder portions are being used, the fingers will not contact the sharp edges or teeth of the graters. Inasmuch as the angled portion 26 having the sharpened slicer edge 24, must project from one side of the sheet or the other, and since the shredder areas lie ahead of and behind the slicer edge 24, said slicer edge is struck from the opposite side of the sheet from the shredders. Since the grater elements 30 are located at the end of the sheet 4, some distance from the slicer edge 24, they are struck outwardly at the same side of the sheet as the slicer edge.

Even though the grater elements 30 are spaced some distance from the slicer edge 24, it has been found that when one uses the slicer element, the article being sliced and the fingers will move to the end of the sheet, and the fingers will become injured through contact with the sharp points 32 of the graters.

In order to prevent this injury through contact with the sharp points of the graters, I provide a transverse rib 34 having a slanted side wall 36 facing the oppositely angled portion 26 which carries the slicer cutting edge 24. In other words, the slanted portion 36 of the rib 34 is angled outwardly of the sheet and away from the cutter portion 24, 26. This rib 34 with its slanted side wall 36, comprises a diverter which will prevent the fingers of the user from coming into contact with the sharp points 32 of the grater elements 30. The arrow 38 in FIG. 2 illustrates how the article being sliced and the fingers holding the article, will be diverted outwardly from the sheet 4, and consequently, outwardly from the sharp points 32 of the grater elements 30.

It should be understood that various changes can be made in the form, details, arrangement and proportions of the various elements without departing from the spirit of the invention.

I claim:

1. In a vegetable grater and slicer, a thin stiff sheet of material having an aperture, a portion of which is defined by an out-of-plane cutting edge, said aperture and cutting edge being disposed intermediate opposite ends of the sheet and elongated transversely of the sheet to operate upon articles moved from one end portion of the sheet to the other across said cutting edge under finger pressure, the end portion of said sheet spaced behind said cutting edge having a grater surface, said sheet having an article and finger diverter extending across the sheet at the approach of said grater surface from said cutting edge, said diverter being inclined upwardly and away from said cutting edge at an angle to the plane of said sheet to divert said articles and the user's fingers from said grater surface.

2. The structure in claim 1, and said grater surface being elongated longitudinally of and adjacent said article and finger diverter to permit utilization of the grater surface with a movement transversely of the sheet without interference from the article and finger diverter.

3. The structure in claim 1, and said article and finger diverter comprising a rib integral with said sheet.

References Cited

UNITED STATES PATENTS

| 1,915,869 | 6/1933 | Rowley | 146—180 |
| 2,505,114 | 4/1950 | Hayman et al. | 146—180 |
| 2,796,900 | 6/1957 | Fedje | 146—180 |

W. GRAYDON ABERCROMBIE, *Primary Examiner.*

U.S. Cl. X.R.

146—180